UNITED STATES PATENT OFFICE.

THOMAS J. LYNCH, OF NEW YORK, N. Y., ASSIGNOR OF ONE-HALF TO HIMSELF AND ONE-HALF TO HENRY S. LIVINGSTON, OF NEW YORK, N. Y.

CHEWING-GUM.

987,003. Specification of Letters Patent. Patented Mar. 14, 1911.

No Drawing. Application filed May 10, 1910. Serial No. 560,401.

*To all whom it may concern:*

Be it known that I, THOMAS J. LYNCH, a citizen of the United States, residing at New York city, county and State of New York, post-office address 170 William street, New York city, State of New York, have invented a new and useful Improvement in Chewing-Gums, of which the following is a clear and exact description.

The present invention consists in the employment of those bacilli characterized by an antagonism to putrefactive and other organisms, or of the products of those bacilli when grown in a suitable culture medium, in the preparation of chewing gums.

The fact has been established that the growth of putrefactive and other organisms is arrested by certain bacilli or their products, especially lactic acid bacilli. Of these lactic acid bacilli I have found that the *Bacillus bulgaricus* serves my purposes best.

In the manufacture of chewing gum I first prepare a base containing the bacilli or their products in a dry form. This base may consist either of the pure cultures dried at temperatures of about 40° C. and subsequently reduced to a fine powder, or of a mixture of the cultures or their products with milk sugar or any other suitable material, carefully dried at temperatures below 50° C., and then reduced to a fine powder. Of this base appropriate quantities are added to the chewing gum and the operations are so conducted that temperatures above 50° C. are avoided.

In the preparation of my chewing gums the cultures or their products may be either intimately mixed with the whole mass of the chewing gum or the chewing gum may be coated with these cultures or the cultures may be sprinkled on the surface of the chewing gum or any two or all three methods may be combined for the manufacture of my new product.

In carrying out my new process I proceed as follows: Any of the chewing gum mixtures heretofore known in the preparation of this article is carefully and intimately mixed with a suitable quantity of any of my cultures or their products, the operation being carried out under the avoidance of temperatures above 50° C. Finally the shapes are treated with a coating mixed with my culture bases or bases made from the products of these cultures.

My new chewing gums possess valuable digestive and antiseptic properties which they exert especially on the mucous membranes of the mouth, throat, stomach and intestine. They relieve indigestion, prevent putrefaction in the intestine, preserve the gums and teeth, relieve catarrhal affections and correct any odors of the breath due to putrefactive processes, and cure the condition known as pyorrhea alveolaris.

Although I have above described an example by which the above-described chewing gums may be obtained, nevertheless I do not wish to be understood as thereby excluding equivalents for the ingredients, or the operations employed in the process. It is probable that substitutes may be employed without departing from the scope of the invention intended to be secured hereby.

Having now described my invention, what I claim as new and desire to secure by Letters Patent, is:

1. Chewing gums comprising suitable gums and bacilli substances antagonistic to putrefactive organisms.

2. Chewing gums comprising suitable gums and lactic acid bacilli substances.

3. Chewing gums comprising suitable gums and *Bacillus bulgaricus* substances.

In testimony whereof I have hereunto set my hand in the presence of two subscribing witnesses.

THOMAS J. LYNCH.

Witnesses:
    ANTHONY GREF,
    ALVIN V. HUPFER.